UNITED STATES PATENT OFFICE 2,617,808

4-THIAZOLIDONE-2-n-CAPROATES AND PREPARATION THEREOF

Jay R. Schenck and Robert K. Clark, Jr., Waukegan, Ill., assignors to Abbott Laboratories, North Chicago, Ill., a corporation of Illinois No Drawing. Application March 31, 1951,
Serial No. 218,698

12 Claims. (Cl. 260—306.7)

This invention relates to novel derivatives of 4-thiazolidone-2-n-caproic acid and methods of manufacture thereof.

Among the objects and advantages of the present invention is a novel process for producing new and novel esters of 4-thiazolidone-2-n-caproic acid having therapeutic properties per se, and which are also intermediates for the manufacture of other organic compounds.

The class of compounds with which the invention is concerned may be represented by the formula:

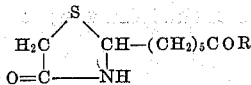

in which R is lower alkoxy and amine including substituted amines. In general, the ester compound of the invention may be prepared by the reaction of thioglycolamide with a lower alkyl ester of ω-formyl caproic acid. The amides are prepared by aminating the ester with ammonia or substituted ammonia to form the corresponding amide. In more specific detail, the following examples illustrate the invention:

Example I

About 30 g. of the ω-carbalkoxy acid chloride of caproic acid, 6-carbethoxy caproyl chloride is dissolved in about 200 ml. of dry xylene, and about 3 g. of palladium on barium sulfate is suspended therein. The air in the reaction vessel is replaced with hydrogen, and the solution is heated to about 115° C. with stirring. The stirring is continued for about 2½ hours, in which time about 90% of the hydrogen chloride from the reaction is evolved. The reaction mixture is cooled, filtered, and the xylene removed under reduced pressure. The ethyl-ω-formyl caproate distills at 55–57° at 1 mm. of mercury.

Example II

About 7 g. of thioglycolamide and about 11 g. of ethyl-ω-formyl caproate (obtained from Example I) are mixed together in 50 ml. of xylene. The solution is refluxed for about an hour. The reaction mixture is then distilled, recovering the product boiling above 170° The ethyl 4-thiazolidone-2-n-caproate is recrystallized from a solution of one part benzene and about 3 parts of Skellysolve B, melting point 49–50° C.

Example III

Following the procedure of Example II, methyl 4-thiazolidone-2-n-caproate may be prepared by reacting thioglycolamide and methyl formyl caproate, melting point 46–47° C.

Example IV

Butyl 4-thiazolidone-2-n-caproate may be prepared according to the procedure of Example II by reacting thioglycolamide and butyl ω-formyl aldehyde. The product is a viscous oil.

Example V

About 200 mg. of ethyl 4-thiazolidone-2-n-caproate are dissolved in about 4 ml. of concentrated ammonium hydroxide and about 3 ml. absolute ethanol. The action mixture is warmed to about 40° C., and allowed to stand for about 3 days. The mixture is evaporated to dryness, and the resulting 4-thiazolidone-2-n-caproamide is recrystallized from aqueous ethanol, melting point 150–155° C.

Example VI

Following the procedure of Example V and substituting methylamine for the ammonium hydroxide, 4-thiazolidone - 2 - N-methyl-n-caproamide is obtained; melting point 145–146° C.

The esters, i. e. the methyl, ethyl, etc. esters of 4-thiazolidone-2-n-caproic acid, may be hydrolyzed to the acid, as by heating the esters with potassium hydroxide in methanol. Other esters or amides may then be produced directly from the acid thus obtained.

Other substituted amides of 4-thiazolidone-2-n-caproic acid may be obtained by aminating an alkyl ester of the acid with a substituted ammonia compound to form the corresponding amide. For instance, 4-thiazolidone-2-N-ethyl-n-caproamide is produced by aminating ethyl 4-thiazolidone-2-n-caproate with ethylamine; 4-thiazolidone-2-N-propyl-n-caproamide with propylamine; 4-thiazolidone-2-N-dimethyl-n-caproamide with dimethylamine; 4-thiazolidone-2-N-diethyl-n-caproamide with diethylamine; 4-thiazolidone-2-N-dipropyl-n-caproamide with dipropylamine; etc.

The carbon atom in the thiazolidone ring substituted with caproic acid radical is an asymmetrical carbon atom, i. e., substituted with four different substituents, and the compound therefore exists in two forms as stereoisomers. The products of the present invention are produced as a racemic mixture, i. e. equal parts of the d and l form, and may be resolved, if desired, into either component according to known methods of resolution.

The 4-thiazolidone-2-n-caproic acid, described in copending application S. N. 190,972, filed October 19, 1950, entitled "Composition of Matter," shows activity against certain micro-organisms. In comparison with the acid, ethyl 4-thiazolidone-2-n-caproate shows about twice the activity, and the 4-thiazolidone-2-n-caproamide shows about two to four times the activity of the acid against the microorganisms.

Others may readily adapt the invention for use under various conditions of service, by employing one or more of the novel features disclosed or equivalents thereof. As at present advised with respect to the apparent scope of our invention, we desire to claim the following subject matter.

We claim:

1. A compound of the formula

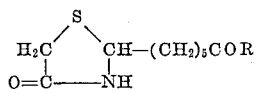

wherein R is a functional group selected from the class consisting of —OCH₃, —OC₂H₅, —OC₃H₇, —OC₄H₉, —NH₂, —NHCH₃, —NHC₂H₅, —NHC₃H₇, —N(CH₃)₂, —N(C₂H₅)₂, and —N(C₃H₇)₂.

2. Ethyl 4-thiazolidone-2-n-caproate.
3. Methyl 4-thiazolidone-2-n-caproate.
4. Butyl 4-thiazolidone-2-n-caproate.
5. 4-Thiazolidone-2-n-caproamide.
6. 4-Thiazolidone-2-N-methyl-n-caproamide.
7. The process which comprises hydrogenating an ω-carbalkoxy acid chloride of caproic acid to form a lower alkyl ester of ω-formyl caproic acid, and heating the resultant aldehyde with thioglycolamide to produce a lower alkyl 4-thiazolidone-2-n-caproate.

8. The method of preparing a compound of the formula

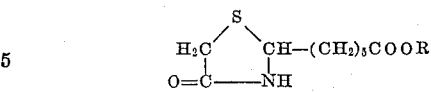

wherein R is a lower alkyl, which comprises heating thioglycolamide with a lower alkyl ester of ω-formal caproic acid.

9. The process which comprises heating ethyl ω-formyl caproate with thioglycolamide to produce ethyl 4-thiazolidone-2-n-caproate.

10. The process which comprises heating methyl ω-formyl caproate with thioglycolamide to produce methyl 4-thiazolidone-2-n-caproate.

11. The process which comprises heating butyl ω-formyl caproate with thioglycolamide to produce butyl 4-thiazolidone-2-n-caproate.

12. The process which comprises heating a lower alkyl ester of ω-formyl caproic acid with thioglycolamide to produce a dl-low ester of 4-thiazolidone-2-n-caproic acid, and aminating the said ester to produce the dl-4-thiazolidone-2-n-caproamide.

JAY R. SCHENCK.
ROBERT K. CLARK, Jr.

REFERENCES CITED

The following references are of record in the file of this patent:

Boehm et al., Chem. Abstracts, vol. 28, page 1033 (1934).

Harris et al., Chem. Abstracts, vol. 40, page 1496 (1946).